(12) United States Patent
Okumura et al.

(10) Patent No.: US 8,160,298 B2
(45) Date of Patent: Apr. 17, 2012

(54) DISPLAY DEVICE

(75) Inventors: Tomohiro Okumura, Kariya (JP);
Ryoichi Nishikawa, Nagoya (JP);
Takaaki Muramatsu, Obu (JP); Shinji Suganuma, Toyota (JP)

(73) Assignees: Denso Corporation, Kariya (JP);
Toyota Jidosha Kabushiki Kaisha, Toyota (JP)

( * ) Notice: Subject to any disclaimer, the term of this patent is extended or adjusted under 35 U.S.C. 154(b) by 849 days.

(21) Appl. No.: 12/254,306

(22) Filed: Oct. 20, 2008

(65) Prior Publication Data

US 2009/0102787 A1 Apr. 23, 2009

(30) Foreign Application Priority Data

Oct. 19, 2007 (JP) ................................. 2007-273109

(51) Int. Cl.
*G06K 9/00* (2006.01)
(52) U.S. Cl. ...................................................... 382/103
(58) Field of Classification Search .................. 382/100,
382/103, 107; 348/169; 377/24.1; 702/165;
345/108, 11, 157, 204, 205; 116/35 A, 47,
116/62.1, 62.4, 288
See application file for complete search history.

(56) References Cited

U.S. PATENT DOCUMENTS

| 4,382,696 | A | * | 5/1983 | Kumar et al. | 368/240 |
| 4,467,323 | A | * | 8/1984 | Kling et al. | 345/24 |
| 4,570,151 | A | * | 2/1986 | Martorano et al. | 340/462 |
| 6,900,808 | B2 | * | 5/2005 | Lassiter et al. | 345/440 |
| 7,729,514 | B2 | * | 6/2010 | Itoh et al. | 382/104 |
| 2005/0280521 | A1 | | 12/2005 | Mizumaki | |
| 2006/0158320 | A1 | * | 7/2006 | Shibata | 340/425.5 |
| 2007/0078598 | A1 | * | 4/2007 | Watanabe et al. | 701/211 |
| 2008/0123322 | A1 | * | 5/2008 | Tane et al. | 362/23 |
| 2011/0241853 | A1 | * | 10/2011 | Harbach et al. | 340/425.5 |

FOREIGN PATENT DOCUMENTS

| JP | 03-135726 | 6/1991 |
| JP | 11-020507 | 1/1999 |
| JP | 11-044559 | 2/1999 |
| JP | 2001-141528 | 5/2001 |
| JP | 2003-137007 | 5/2003 |
| JP | 2003-262542 | 9/2003 |

OTHER PUBLICATIONS

Japanese Office Action dated Feb. 2, 2010, issued in corresponding Japanese Application No. 2007-273109.
Chinese Office Action dated Apr. 29, 2011, issued in corresponding Chinese Application No. 200810170544.7.
German Office Action dated Jul. 4, 2011, issued in corresponding German Application No. 10 2008 051 749.6-41.
Japanese Office Action dated Jul. 14, 2009, issued in corresponding Japanese Application No. 2007-273109.

* cited by examiner

*Primary Examiner* — Jason M Repko
*Assistant Examiner* — Shervin Nakhjavan
(74) *Attorney, Agent, or Firm* — Nixon & Vanderhye PC

(57) ABSTRACT

A display device includes a display panel and a control unit. The control unit is configured to control a display condition of the display panel by successively switching a plurality of frames, thereby to display a pointer image indicating a pointer and a path image indicating a path of motion of the pointer image. The path image of a first frame, which is any one of the plurality of frames, is provided continuously from a second location where the pointer image of a second frame, which is another one of the multiple frames and immediately before the first frame, is displayed to a first location where the pointer image of the first frame is displayed.

6 Claims, 4 Drawing Sheets

DISPLAY DEVICE

CROSS REFERENCE TO RELATED APPLICATION

This application is based on Japanese Patent Application No. 2007-273109 filed on Oct. 19, 2007, the disclosure of which is incorporated herein by reference.

FIELD OF THE INVENTION

The present invention relates to a display device for displaying a pointer image indicating a pointer.

BACKGROUND OF THE INVENTION

For example, JP-A-2003-137007 describes a display device having a display panel such as a liquid crystal panel in which a plurality of pixels is formed in the form of matrix. In the described display device, a pointer image indicating a pointer and a path image indicating rotational motion of the pointer image are displayed on the display panel.

In such a display device, an area where the pointer image moves in a rotational manner is separated into multiple fan-shaped sections with respect to a direction of rotation of the pointer image, and one of the multiple fan-shaped sections is displayed as the path image. For example, one of the multiple fan-shaped sections is displayed as the path image in a color different from a color of a background of the pointer image, and the remaining fan-shaped sections is displayed in the color of the background. Further, images of thirty frames are switched in a second, and thus motions of the pointer image and the path image are displayed on the display panel.

Although not described in JP-A-2003-137007, if a speed of the rotational motion of the pointer image is high, such as if an angle defined between the pointer image in one frame and the pointer image in the subsequent frame is large, the motion of the pointer image will be recognized as flapping or discontinuous between the frames. That is, it is difficult to display the pointer image to move smoothly.

SUMMARY OF THE INVENTION

The present invention is made in view of the foregoing matter and it is an object of the present invention to provide a display device which is capable of displaying smooth motion of a pointer image.

According to an aspect of the present invention, a display device includes a display panel and a control unit. The control unit is configured to control a display condition of the display panel by successively switching a plurality of frames, thereby to display a pointer image indicating a pointer and a path image indicating a path of motion of the pointer image. The path image of a first frame is provided to be continuous from a second location corresponding to a location where the pointer image of a second frame is displayed to a first location where the pointer image of the first frame is displayed. The first frame is any one of the plurality of frames, and the second frame is another one of the plurality of frames and displayed immediately before the first frame.

Accordingly, since the path image of the first frame is displayed over an area between the second location where the pointer image of the second frame was displayed and the first location where the pointer image of the first frame is displayed, that is, the path image of the first frame is displayed continuously from the second location to the first location, it is less likely that the motion of the pointer image will be visible discontinuous between the second frame and the first frame. That is, the pointer image can be shown to move smoothly. Accordingly, an appearance of the motion of the pointer image improves.

According to a second aspect of the present invention, the control unit is configured to prohibit the path image of the first frame from being displayed when a distance between the pointer image of the second frame and the pointer image of the first frame is equal to or less than a predetermined distance. In a case where the distance between the pointer image of the second frame and the pointer image of the first frame is equal to or less than the predetermined distance, that is, a speed of the motion of the pointer image from the second frame to the first frame is equal to or less than a predetermined speed, the pointer image will be hardly shown discontinuously. In such a case, therefore, even when the path image is not displayed, it is possible to recognize the pointer image moving smoothly.

According to a third aspect of the present invention, the control unit is configured to display the path image of the first frame to include a gradation portion at least at a part thereof.

For example, the gradation portion is displayed at a portion adjacent to the second location, and is displayed in a gradation manner such that a color tone gradually varies from a color tone of the pointer image to a color tone of a background of the pointer image, toward the second location. In such a case, the persistence of vision of the motion of the pointer image can be blurred adjacent to the second location. Therefore, the recognizability of the motion of the pointer image can be improved by the path image with the gradation portion.

As another example, the gradation portion can be provided at a first portion of the path image adjacent to the first location and a second portion of the path image adjacent to the second location. In the first portion, the color tone gradually varies from the color tone of the background of the pointer image to the color tone of the pointer image, toward the first location. In the second portion, the color tone gradually varies from the color tone of the background to a color tone of the pointer image of the second frame, toward the second location. In such a case, a continuous appearance between the path image and the pointer image at the first location is improved while highlighting the second location and the first location.

As further another example, in a case where the pointer image is displayed to move in a rotational manner, the path image is displayed in the fan shape. In such a case, the gradation portion can be provided adjacent to a circumference of the fan shape such that the color tone gradually varies from the color tone of the pointer image to the color tone of the background, as a function of distance from a center of the fan shape. In the case where the pointer image is displayed to move in the rotational manner, a distance of motion of an outer end is greater than a distance of motion of an inner end, when the pointer image moves from the second location to the first location. That is, the outer end of the pointer image moves more than the inner end of the pointer image. In such a case, the persistence of vision of the pointer image is more blurred to the outer end. Accordingly, the recognizability of the motion of the pointer image can be improved.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXEMPLARY EMBODIMENT

Hereinafter, an exemplary embodiment of the present invention will be described with reference to the accompanying drawings.

Figure 1:
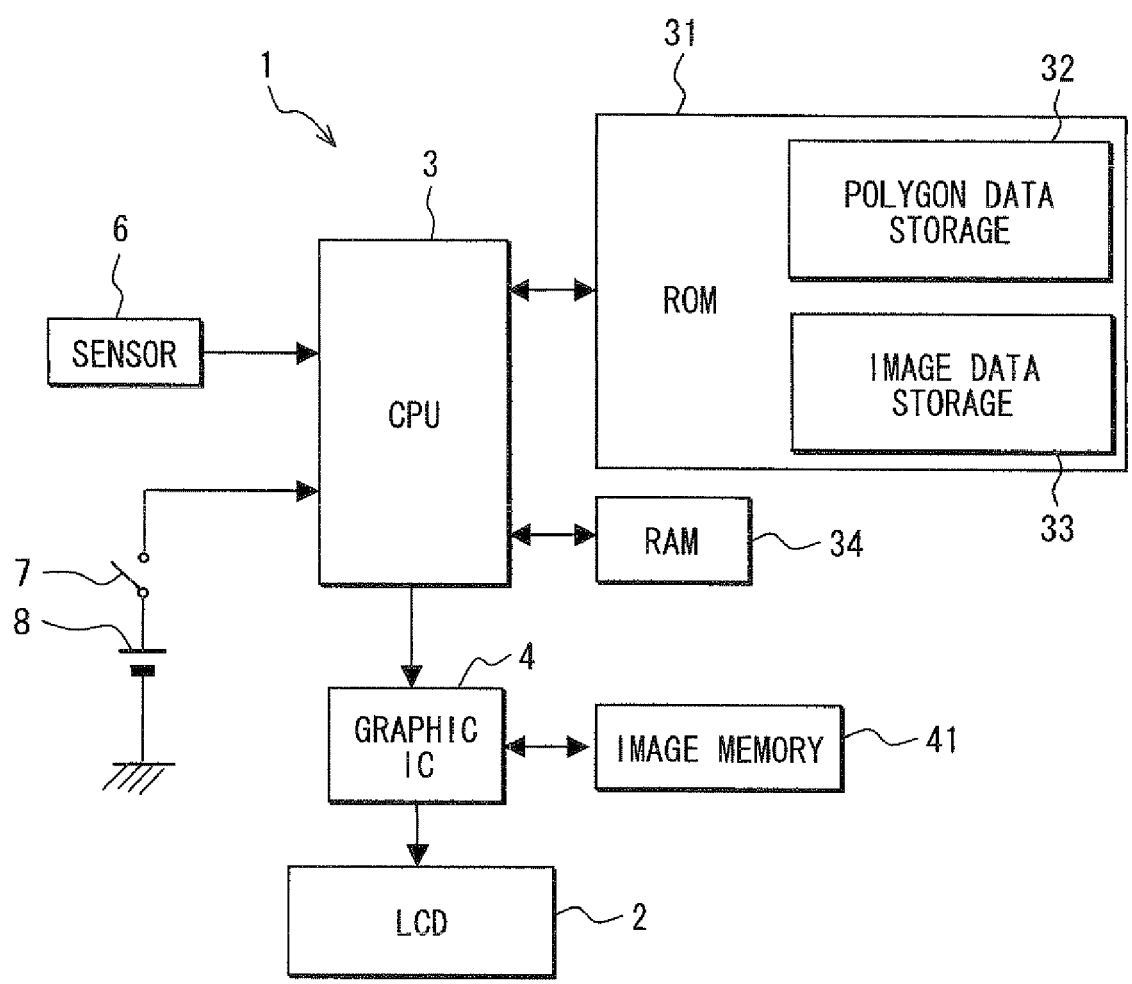
FIG. 1 is a circuit construction diagram of a display device according to an embodiment of the present invention.

Referring to FIG. 1, a display device 1 of the present embodiment is, for example, used as a vehicular display device. The display device 1 is provided with a display panel 2, a CPU (central processing unit) 3 and a graphic IC (integral circuit) 4 as a control unit, a ROM (read only memory) 31, a RAM (random access memory) 34 and an image memory 41.

The display panel 2 is, for example, a liquid crystal panel 2. A plurality of pixels is formed in the liquid crystal panel 2 in a matrix shape. The liquid crystal panel 2 is, for example, a liquid crystal panel of an active matrix system driven by a thin film transistor (TFT) (not shown). Each of the pixels houses a red pixel, a green pixel and a blue pixel therein, and a voltage is applied to a gate of TFT to control a voltage applied to each of the red pixel, the green pixel and the blue pixel in the pixel, thereby controlling an optical transmittance of each of the red pixel, the green pixel and the blue pixel in the pixel.

A light emitting diode is disposed behind the liquid crystal panel 2 for illuminating the liquid crystal panel 2. The light emitting diode emits white light, for example. When the liquid crystal display panel 2 is illuminated by the light emitting diode 3 in a condition that the optical transmittances of the red pixel, the green pixel and the blue pixel of each of the pixels are controlled, a full color display is made on the liquid crystal panel 2.

The CPU 3 receives a signal indicative of speed information from a speed sensor 6 that detects a speed of the vehicle, and inputs the signal into the graphic IC 4. The CPU 3 is supplied with electric power from a battery 8 through an ignition switch 7 of the vehicle, and thus is driven by the electric power from the battery 8.

The ROM 31 is provided with a polygon data storage 32 and an image data storage 33. The polygon data storage 32 stores polygon data of a speed meter image 5 shown in FIG. 2. The image data storage 33 stores image data of the speed meter image 5. The polygon data includes multiple polygons, which are provided by dividing a display space of the speed meter image 5 into plural sections. For example, each polygon has a generally triangular shape. The image data is constructed of textures applied to the respective polygons. Namely, each texture of the image data is applied to a corresponding polygon of the polygon data, thereby to form the speed meter image 5 on the liquid crystal display 2.

In response to commands from the CPU 3, the polygon data is transmitted to the RAM 34 from the polygon data storage 32, and the image data is transmitted from the image data storage 33 to the image memory 41. The graphic IC 4 controls voltages to be applied to the red pixel, the green pixel and the blue pixel of each pixel based on the polygon data of the RAM 34, the image data of the image memory 41 and the inputted speed signal, thereby to control display conditions of the pixels. The display condition of the liquid crystal panel 2 is controlled by successively switching images of multiple frames. For example, images of thirty frames are successively switched in a second. Thus, motions of a pointer image 51 and a path image 52 are displayed, as shown in FIG. 2.

Alternatively, it may be possible to configure such that the display condition of each pixel is controlled by the graphic IC 4 based on the polygon data of the polygon data storage 32 and the image data of the image data storage 33 without transmitting the polygon data and the image data to the RAM 34 and the image memory 41, respectively. According to the above configuration, the speed meter image 5 is displayed on the liquid crystal panel 2, as shown in FIG. 2.

Figure 2:
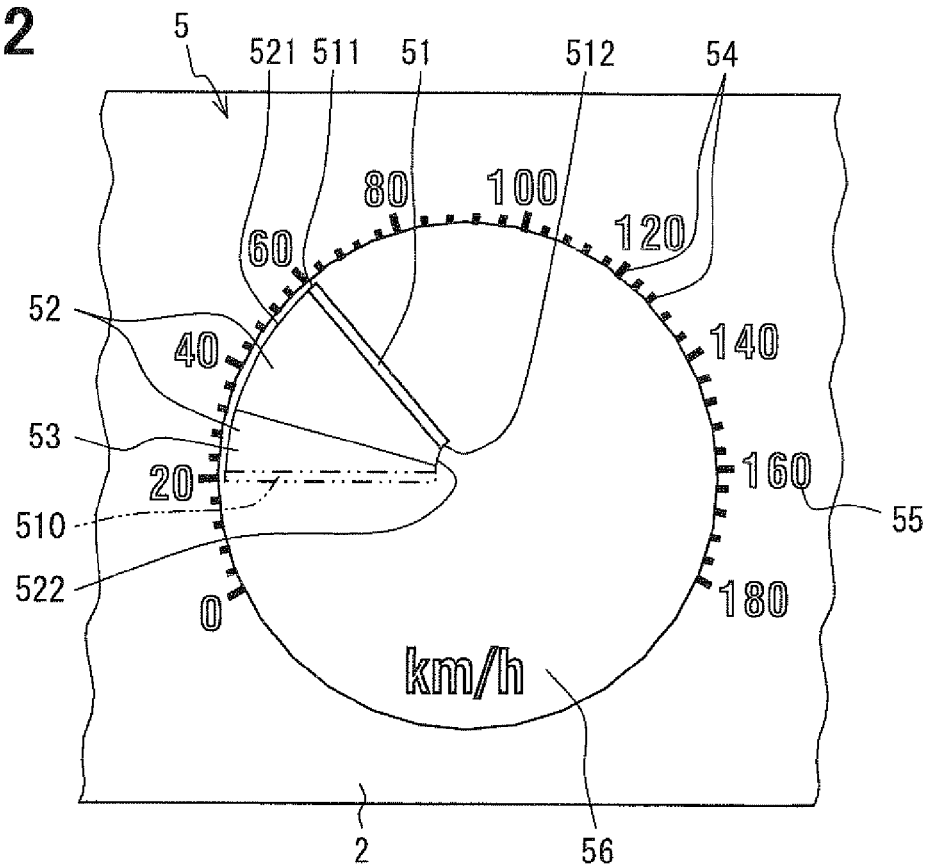
FIG. 2 is a front view of a liquid crystal panel of the display device according to the embodiment.

FIG. 2 shows the speed meter image 5 of a first frame, which is one of the multiple frames. The speed meter image 5 includes the pointer image 51 indicating a pointer movable in a rotational manner, the path image 52 for indicating a path of motion (e.g., rotational motion) of the pointer image 51, a scale image 54 indicating a scale, a letter image 55 indicating letters or numbers.

For example, a color tone of a background 56 of the pointer image 51 is black, and a color tone of the pointer image 51 is red. Here, the color tone is determined by at least one of hue and brightness. The scale image 54 and the letter image 55 are displayed in white over the black background 56.

In FIG. 2, the pointer image 51 of the first frame is shown by a solid line, and a pointer image 510 of a second frame, which was displayed one frame before the first frame, is shown by a double-dashed chain line. The path image 52 is displayed over an area between a first location where the pointer image 51 of the first frame is displayed and a second location where the pointer image 510 of the second frame was displayed, so as to show the path of motion of the pointer image 51 from the second frame to the first frame. Further, the path image 52 is displayed continuously from the first location to the second location.

For example, the path image 52 has a fan shape defined by the pointer images 51, 510, a first line 521 and a second line 522. The first line 521 and the second line 522 correspond to tracks of a first end 511 and a second end 512 of the pointer image 51, which are caused when the pointer image 51 moves from the second location to the first location.

The path image 52 of the first frame includes a gradation portion 53 at least at a part. For example, the path image 52 has the gradation portion 53 at a portion adjacent to the second location where the pointer image 510 of the second frame was displayed. In other words, the gradation portion 53 is formed in an area that begins at a portion of the path image 52 of the first frame and ends at the second location. The gradation portion 53 has a color tone that gradually varies from the color tone of the pointer image 51, such as the red, to the color tone of the background 56, such as the black, from the portion toward the second location. In the path image 52, an area between the gradation portion 53 and the pointer image 51 is displayed in the same color tone as that of the pointer image 51, such as in the red.

As described above, the path image 52 of the first frame is formed continuously from the first location where the pointer image 51 of the first frame is displayed to the second location where the pointer image 510 of the second frame, which was displayed immediately before the first frame, was displayed.

Therefore, it is less likely that the motion of the pointer image 51 will be shown discontinuously, like flapping, between the second frame and the first frame. Accordingly, the pointer image 51 can be shown to move smoothly.

Since the path image 52 includes the gradation portion 53 in which the color one gradually varies from the color tone of the pointer image 51 to the color tone of the background 56, toward the second location, the path image 52 is blurred toward the second location by the gradation portion 53. That is, the persistence of motion of the pointer image 51 is blurred toward the second location by the gradation portion 53 in the first frame. As such, the recognizability of the motion of the pointer image 51 can be improved by the path image 52 including the gradation portion 53.

The path image 52 is formed as the plane defined by the pointer images 51, 510 and the first and second lines 521, 522, which show the tracks of the first and second ends 511, 521 of the pointer image 51 from the second location to the first location. Therefore, the path of motion of the pointer image 51 can be more precisely displayed by the path image 52.

Figure 3:
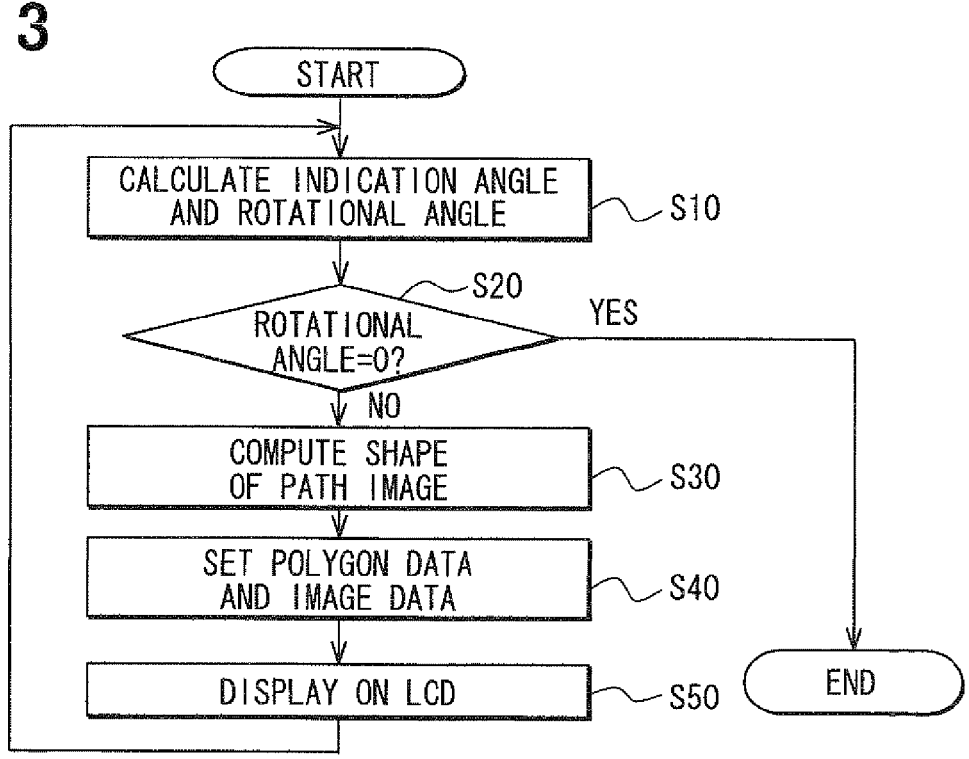
FIG. 3 is a flowchart showing a control operation executed by an CPU of the display device according to the embodiment.

Next, a control operation executed by the CPU 3 for displaying the pointer image 51 and the path image 52 will be described with reference to FIG. 3. A series of processing S10-S50 corresponds to a control of displaying the image of one frame.

The control operation is started as the ignition switch 7 is turned on. At S10, the CPU 3 reads the speed signal from the speed sensor 6, and computes an indication angle of the pointer image 51 and a rotational angle of the pointer image 51 from the previous frame, that is, a rotation angle between the pointer image 51 to be displayed and the pointer image 510 of the previous frame, based on the speed signal. At S20, it is determined whether a distance between the second location and the first location is zero or not, such as the rotational angle of the pointer image 51 is zero or not.

When it is determined at S20 that the rotational angle of the pointer image 51 is not zero, that is, when the pointer image 51 is to be moved from the displayed location of the previous frame, the shape of the path image 52 including the gradation portion 53 is computed at S30 based on the indication angle and the rotational angle calculated at S10. At S40, the polygon data and the image data of the pointer image 51 and the path image 52 are set based on the indication angle and the shape of the path image 52 computed at S10 and S30.

At S50, the graphic IC 4 sticks each texture of the image data to the polygon of the polygon data set at S40 such that the pointer image 51 and the path image 52 are formed on the liquid crystal panel 2, as shown in FIG. 2. A color tone and an alpha value (transparency) of each polygon of the polygon data are set based on the shape of the path image 52 computed at S30, and thus the path image 52 including the gradation portion 53 is displayed. A gradation condition of the gradation portion 53 is set in accordance with the alpha value.

After S50, the processing from S10 to S50 is repeated for each frame. When it is determined at S20 that the rotational angle is zero, that is, when the pointer image 51 is not to be moved, the control operation is finished.

In the above example, it is determined at S20 whether the rotational angle is zero or not. Alternatively, it can be determined at S20 whether the rotational angle is equal to or less than a predetermined angle. In such a case, the path image 52 is displayed, if the rotational angle of the pointer image 51 exceeds the predetermined angle. The path image 52 is not displayed if the rotational angle is equal to or less than the predetermined angle, that is, if the rotational speed is low.

For example, in a case where the rotational speed of the pointer image 51 is high, that is, where the rotational angle between the pointer image 510 of the previous frame and the pointer image 51 of the subsequent frame is large, if the path image 52 is not displayed, the rotational motion of the pointer image 51 is visible discontinuous from the previous frame to the subsequent frame. That is, if the path image 52 is not displayed in the case shown in FIG. 2, the pointer image 51 is shown discontinuous or flapping when moved from the second location of the second frame to the first location of the first frame. Thus, an appearance of the motion of the pointer image 51 is likely to be reduced.

On the other hand, in a case where the rotational speed of the pointer image 51 is low, that is, where the rotational angle between the pointer image 510 of the previous frame and the pointer image 51 of the subsequent frame is small, the motion of the pointer image 51 will not be shown discontinuous or flapping. For example, in a case where the pointer image 510 indicates the vicinity of "60" of the letter image 55 of the second frame and the pointer image 51 indicates "60" of the letter image 55 of the first frame, that is, where the rotational angle is equal to or less than the predetermined angle and the rotational speed is low, the motion of the pointer image 51 will not be visible discontinuous when the second frame is switched to the first frame. In such a case, it is not necessary to display the path image 52.

Accordingly, it is possible to configure such that the path image 52 is not displayed when the rotational angle of the pointer image 51 is equal to or less than the predetermined angle, that is, the rotational speed of the pointer image 51 is equal to or less than a predetermined speed.

In the above example, the alpha value is calculated, and the path image 52 including the gradation portion 53 is made based the alpha value. Instead, the path image 52 including the gradation portion 53 can be stored in the image data storage 33 as the image data, and the path image 52 including the gradation portion 53 can be made by sticking the image data to the polygon. Also in such a case, the similar effects as discussed above are provided.

Also, the polygon data storage 32 is not always necessary. In a case where the ROM 31 does not have the polygon data storage 32, the image data corresponding to various shapes of the path images 52 computed at S30 is stored in the image data storage 33. Further, at S40, the image data of the pointer image 51 and the path image 52 is set based on the indication angle and the path image 52 computed at S10 and S30. At S50, the graphic IC 4 makes the pointer image 51 and the path image 52 on the liquid crystal panel 2 using the image data set at S40. Also in such a case, the similar effects as discussed above are provided.

In the present embodiment, as discussed above, the display device 1 includes the display panel 2, such as the liquid crystal panel, and the control unit, such as the CPU 3 and graphic IC 4. The display panel 2 is capable of displaying the pointer image 51 indicating the pointer and the path image 52 indicating the path of motion of the pointer image 51. The control unit is configured to control a display condition of the display panel 2 by successively switching multiple frames each including the pointer image 51 and the path image 52, thereby to display the pointer image and the path image. The path image 52 of the first frame, which is any one of the multiple frame, is provided over the area that begins at the second location where the pointer image 510 of the second frame, which is another one of the multiple frames and immediately before the first frame, was displayed and ends at the first location where the pointer image 51 of the first frame is displayed. That is, the image path 52 is provided to be continuous from the second location to the first location.

Accordingly, the motion of the pointer image from the second location of the previous frame to the first location of the subsequent frame is displayed continuously. Namely, the pointer image 51 can be shown to move smoothly from the second location of the previous frame to the first location of the subsequent frame. Accordingly, the appearance of the motion of the pointer image improves.

Figure 4:
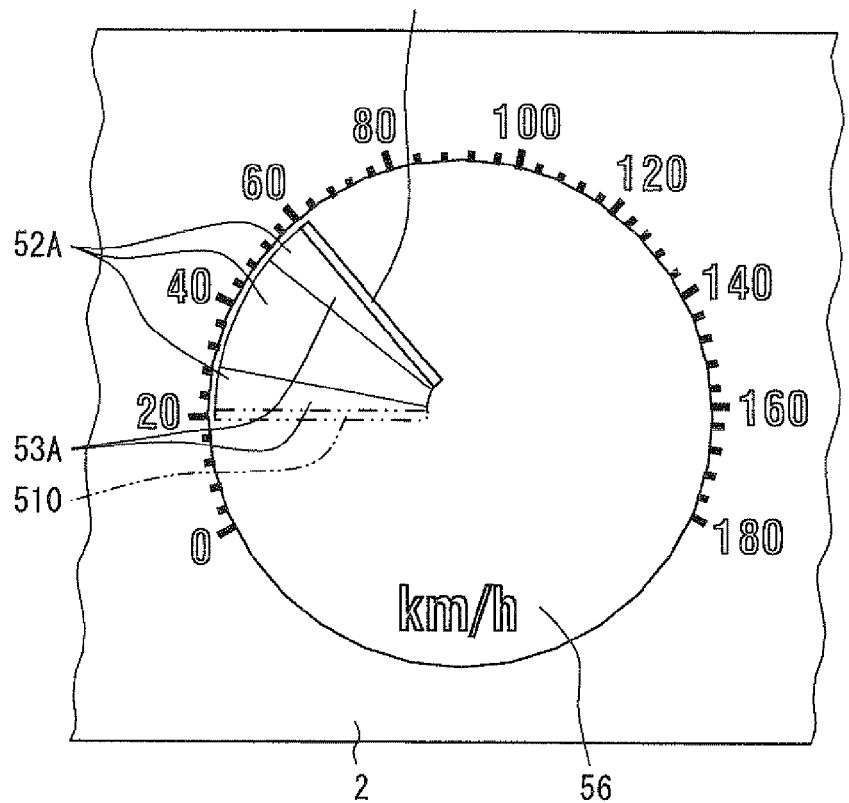
FIG. 4 is a front view of the liquid crystal panel of the display device according to a first modified example of the embodiment.

The above embodiment can be modified in various ways. For example, as a first modified example of the above embodiment, the gradation portion 53 may be modified. For example, as shown in FIG. 4, a path image 52A for indicating the path of motion of the pointer image 51 has gradation portions 53A at multiple portions adjacent to the first location where the pointer image 51 of the firs frame is displayed and the second location where the pointer image 510 of the second frame was displayed.

For example, one of the gradation portions 53A, which is adjacent to the second location, is displayed in a gradation manner such that the color tone gradually varies from the black of the background 56 to the red of the pointer image 51, toward the second location. The other of the gradation portions 53A, which is adjacent to the first location, is displayed in a gradation manner such that the color tone gradually varies from the black of the background 56 to the red of the pointer image 51, toward the first location.

Also in such a case, the similar effects as described above are provided. Further, a continuous appearance from the path image 52A to the pointer image 51 is improved while highlighting the first location and the second location.

Figure 5:
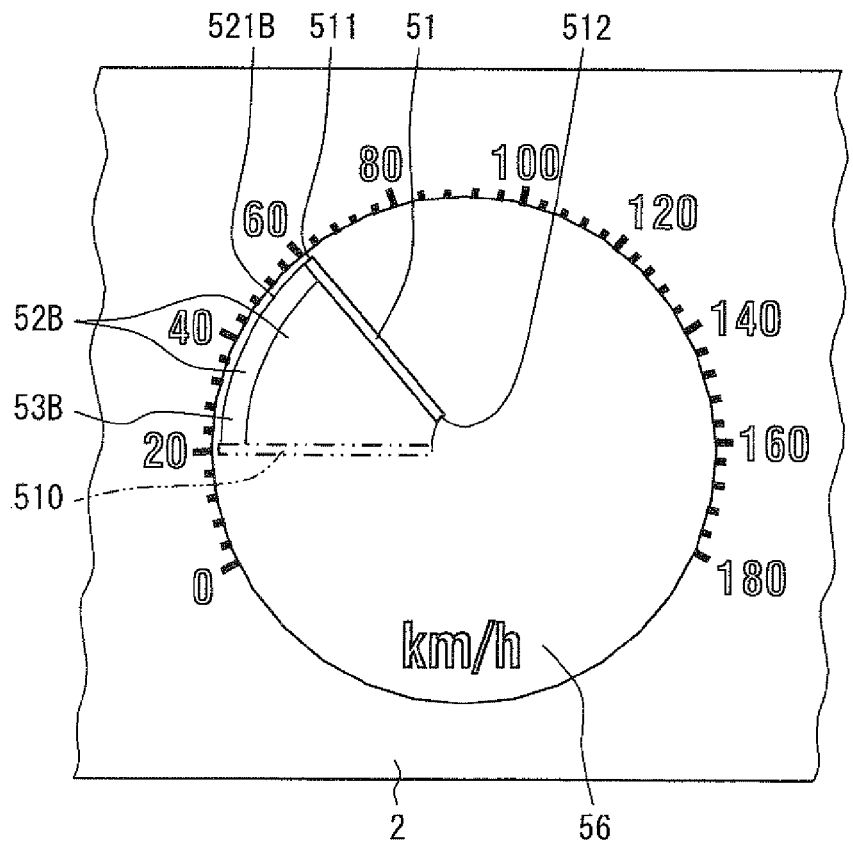
FIG. 5 is a front view of the liquid crystal panel of the display device according to a second modified example of the embodiment.

FIG. 5 shows a second modified example of the above embodiment. The gradation portions 53, 53A are not limited to the above examples, but may be further modified.

In the example shown in FIG. 5, a path image 52B indicating the path of motion of the pointer image 51 from the second frame to the first frame has a gradation portion 53B along an outer portion (circumference) 521B of the fan shape, in place of the gradation portions 53, 53A. The gradation portion 53B is displayed such that the color tone gradually varies from the red of the pointer image 51 to the black of the background 56 in a radially outward direction. Also in such a case, the similar effects as described above can be provided.

When the pointer image 51 moves in the rotational manner, the first end 511 moves more than the second end 512. That is, a path length of the first end 511 from the second location to the first location is greater than a path length of the second end 512 from the second location to the first location. In such a case, the persistence of vision of the first end 511 is more blurred than that of the first end 512, and is displayed in the similar color of the background 56. That is, since the gradation portion 53B is displayed such that the outer portion of the path image 52B, which shows the path of the first end 511, is shown in the black, the gradation portion 53B can be recognized as the persistence of vision of the pointer image 51. Accordingly, the appearance of the motion of the pointer image 51 can be improved.

Figure 6:
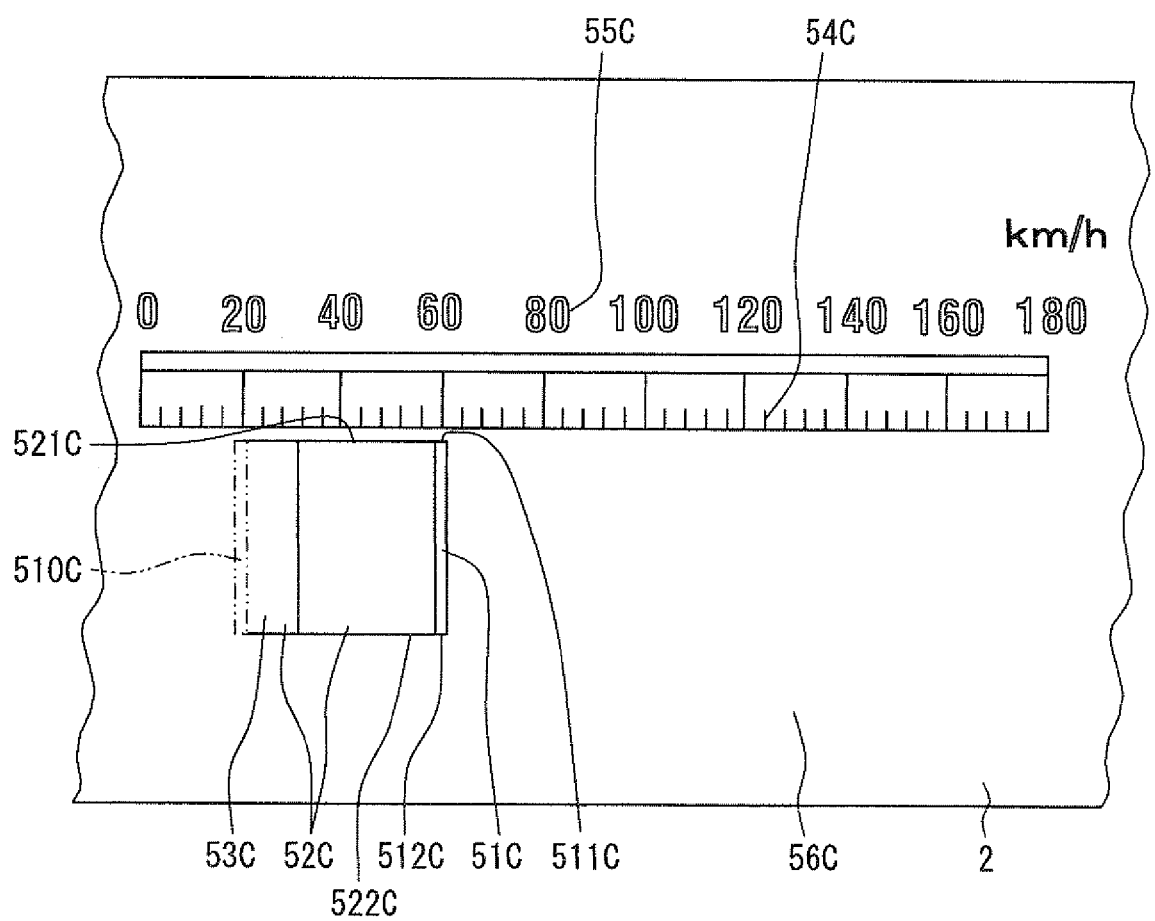
FIG. 6 is a front view of the liquid crystal panel of the display device according to a third modified example of the embodiment.

FIG. 6 shows a third modified example of the above embodiment. In the above examples, the path image 52, 52A, 52B are displayed for highlighting the motion of the pointer mage 51 that moves in the rotational manner. Alternatively, the path image 52, 52A, 52B can be displayed for highlighting the motion of a pointer image 51C that makes a transitional motion, as shown in FIG. 6.

In the example of FIG. 6, a scale image 54C is displayed in a straight form, and letter images 55C are displayed along the scale image 54C for indicating the magnitude. The pointer image 51C is displayed to move in a longitudinal direction of the scale image 54C, such as in a right and left direction in FIG. 6. Further, a path image 52C is displayed for displaying a path of motion of the pointer image 510.

In FIG. 6, the pointer image 51C of the first frame is shown by a solid line, and a pointer image 510C of a second frame, which is immediately before the first frame, is shown by a double-dashed chain line. The path image 52C is displayed continuously from the second location where the pointer image 510C of the second frame was displayed to the first location where the pointer image 51C of the first frame is displayed, thereby to display the path of motion of the pointer image 51C.

Specifically, the path image 52C is provided by a plane, such as a rectangular-shaped plane, defined by a first line 521C, a second line 522C and the pointer images 51C, 510C. The first line 521C shows a path of a first end 511C of the pointer image 51C when the pointer image 51C moves from the second location to the first location. The second line 522C shows a path of a second end 512C of the pointer image 51C when the pointer image 51C moves from the second location to the first location.

The path image 52C of the first frame includes a gradation portion 53C adjacent to the second location where the pointer image 510C of the second frame was displayed. The gradation portion 53C is displayed such that the color tone gradually varies from the red of the pointer image 51C to the black of a background 56C, toward the second location. In the path image 52C, a portion between the pointer image 51 and the gradation portion 53C is displayed in the red of the pointer image 51C. Also in such a case, the similar effects as described above can be provided.

In the above examples, the gradation portions 53, 53A, 53B, 53C are provided as the part of the path images 52, 52A, 52B, 52C. Alternatively, the entirety of the path images 52, 52A, 52B, 52C can be displayed in the gradation manner. For example, in FIG. 2, the path image 52 can be displayed in the gradation manner such that the color tone gradually varies from the red of the pointer image 51 to the black of the background 56, from the first location toward the second location. For example, in FIG. 5, the path image 52B can be displayed in the gradation manner such that the color tone gradually varies from the red of the pointer image 51 to the black of the background 56, from the second end 512 toward the radially outer portion 521B. Also in such cases, the similar effects as described above can be achieved.

In the above examples each of the path images 52, 52A, 52B, 52C is provided by the plane defined by the pointer images 51, 51C, 510, 510C and the first and second lines 521, 521C, 522, 522C, which are caused as the tracks of the first and second ends 511, 511C, 512, 512C when the pointer image 51, 51C moves from the second location to the first location. However, the path images 52, 52A, 52B, 52C can be modified in other ways as long as the path of the motion of the pointer image is highlighted. For example, the path image can be displayed with a dimension (width) smaller than a length of the pointer image 51, 51C, the dimension being measured in a longitudinal direction of the pointer image 51, 51C.

In the above examples, each of the path images 52, 52A, 52B, 52C is displayed to be continuous from the second location where the pointer image 510, 510C of the second frame was displayed to the first location where the pointer image 51, 51C of the first frame is displayed. That is, the path image 52, 52A, 52B, 52C is formed over the area from the second location to the first location. However, the path image 52, 52A, 52B, 52C is not limited to the above. For example, the path image can be displayed to be continuous from a third location where the pointer image of a third frame, which was displayed before the second frame, was displayed up to the first location where the pointer image 51, 51C is displayed in the first frame.

The display panel 2 can be constructed of a monochrome liquid crystal panel without a full color display.

Further, instead of the liquid crystal panel as a light receiving type (non-light emitting type) display panel, the display panel 2 can be constructed of an EL (electro/luminescence) display panel as a light emitting type display panel. In addition, the display device 1 is not limited to the display device for the vehicle. Further, the color tones and combinations of the various portions of the image displayed on the display panel 2 are not limited to the above examples.

While only the exemplary embodiments have been chosen to illustrate the present invention, it will be apparent to those skilled in the art from this disclosure that various changes and modifications can be made therein without departing from the scope of the invention as defined in the appended claims. The above examples may be implemented with various combinations. Furthermore, the foregoing description of the preferred embodiments according to the present invention is provided for illustration only, and not for the purpose of limiting the invention as defined by the appended claims and their equivalents.

What is claimed is:

1. A display device comprising:
a display panel; and
a control unit configured to control a display condition of the display panel by successively switching a plurality of frames, thereby to display a pointer image indicating a pointer and a path image indicating a path of motion of the pointer image, the path image of a first frame being provided continuously from a second location corresponding to a location where the pointer image of a second frame is displayed to a first location where the pointer image of the first frame is displayed, the first frame being any one of the plurality of frames and the second frame being another one of the plurality of frames and being immediately before the first frame.

2. The display device according to claim 1, wherein the control unit is configured to prohibit the path image of the first frame from being displayed in a case where a distance between the first location and the second location is equal to or less than a predetermined distance.

3. The display device according to claim 1, wherein the control unit is configured to display the path image to include a gradation portion at least at a part of the path image, the gradation portion being displayed in a gradation manner where a color tone gradually varies.

4. The display device according to claim 3, wherein the control unit is configured such that the path image includes the gradation portion at a portion adjacent to the second location, and the gradation portion has the color tone that gradually varies from a color tone of the pointer image to a color tone of a background of the pointer image, toward the second location.

5. The display device according to claim 3, wherein the control unit is configured such that the path image includes the gradation portion at a first portion adjacent to the first location and a second portion adjacent to the second location,
the gradation portion provided at the first portion has a color tone that gradually varies from a color tone of a background of the pointer image to a color tone of the pointer image, toward the first location, and
the gradation portion provided at the second location has a color tone that gradually varies from the color tone of the background to a color tone of the pointer image, toward the second location.

6. The display device according to claim 3, wherein the motion of the pointer image is a rotational motion rotating about a center of rotation,
the path image has a fan shape defined by the pointer image of the first frame and the pointer image of the second frame,
the gradation portion is provided adjacent to an outer portion of the fan shape, and
the gradation portion has a color tone that gradually varies from a color tone of the pointer image to a color tone of a background of the pointer image as a function of distance from the center of rotation.

* * * * *